W. P. ANDERSON, N. C. CLARKE AND J. F. WHITELAW.
ARTIFICIAL ARM.
APPLICATION FILED MAY 21, 1920.
Reissued Aug. 31, 1920. 14,939.
5 SHEETS—SHEET 1.
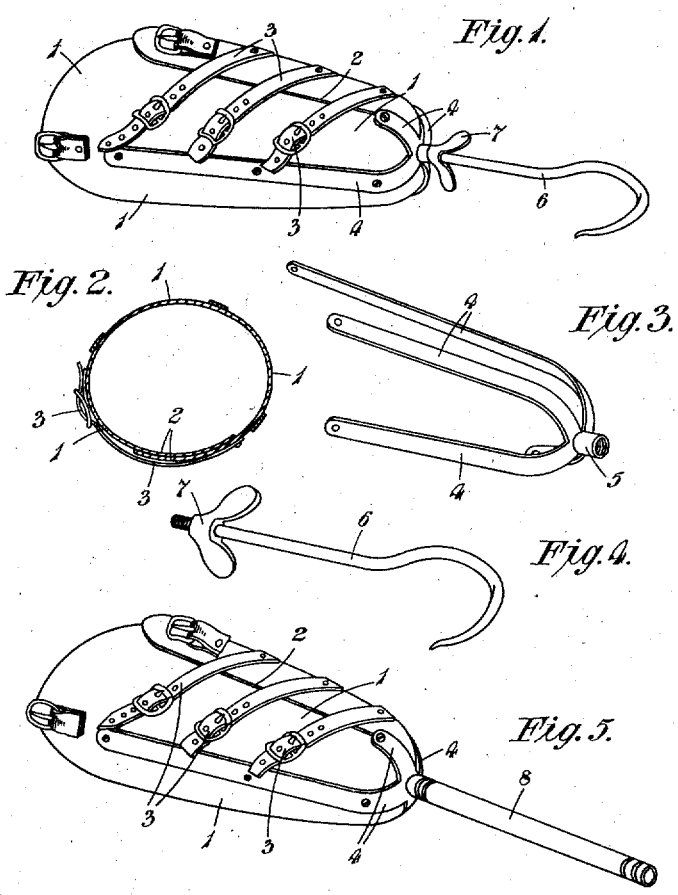
Inventors-
William Purves Anderson
Norman Carlyle Clarke
and John Falconer Whitelaw,
By B. Singer, Atty.

W. P. ANDERSON, N. C. CLARKE AND J. F. WHITELAW.

ARTIFICIAL ARM.

APPLICATION FILED MAY 21, 1920.

Reissued Aug. 31, 1920.

14,939.

5 SHEETS—SHEET 2.

Inventors.
William Purves Anderson,
Norman Carlyle Clarke
and John Falconer Whitelaw,
By P. Singer, Atty.

W. P. ANDERSON, N. C. CLARKE AND J. F. WHITELAW.

ARTIFICIAL ARM.

APPLICATION FILED MAY 21, 1920.

Reissued Aug. 31, 1920. 14,939.

5 SHEETS—SHEET 3.

Inventors-
William Purves Anderson
Norman Carlyle Clarke,
and John Falconer Whitelaw
by B. Singer, Atty.

W. P. ANDERSON, N. C. CLARKE AND J. F. WHITELAW.

ARTIFICIAL ARM.

APPLICATION FILED MAY 21, 1920.

Reissued Aug. 31, 1920.

14,939.

5 SHEETS—SHEET 4.

Inventors-
William Purves Anderson,
Norman Carlyle Clarke
and John Falconer Whitelaw,
By P. Singer, Atty.

W. P. ANDERSON, N. C. CLARKE AND J. F. WHITELAW.

ARTIFICIAL ARM.

APPLICATION FILED MAY 21, 1920.

Reissued Aug. 31, 1920.

14,939.

5 SHEETS—SHEET 5.

Inventors—
William Purves Anderson
Norman Carlyle Clarke,
and John Falconer Whitelaw,
By B. Singer. Atty.

UNITED STATES PATENT OFFICE.

WILLIAM PURVES ANDERSON AND NORMAN CARLYLE CLARKE, OF BIRMINGHAM, AND JOHN FALCONER WHITELAW, OF ERDINGTON, ENGLAND.

ARTIFICIAL ARM.

14,939. Specification of Reissued Letters Patent. Reissued Aug. 31, 1920.

Original No. 1,272,179, dated July 9, 1918, Serial No. 172,041, filed May 31, 1917. Application for reissue filed May 21, 1920. Serial No. 383,285.

*To all whom it may concern:*

Be it known that we, WILLIAM PURVES ANDERSON, NORMAN CARLYLE CLARKE, and JOHN FALCONER WHITELAW, subjects of the King of Great Britain, residing at 140 Station road, Wylde Green, Birmingham, in the county of Warwick, England, 199 Station road, Wylde Green, aforesaid, and 170 South road, Erdington, aforesaid, respectively, have invented certain new and useful Improvements in Artificial Arms; and we do hereby declare the following to be a full, clear, and exact description of the same.

Our invention comprises improvements in artificial arms or substitutes for arms.

The first object of the present invention is the provision of an improved arm which is particularly adapted for use for rough work for which reason it is known as a "worker's arm", such arm preferably including a detachable hook which may be interchanged with a forearm, the socket for receiving the stump of the arm being of improved construction and readily adjustable to suit the stumps of various sizes.

Another object of the invention is the provision of improved controlling mechanism which is so arranged that the raising of the upper arm will automatically cause the forearm to rise above the elbow.

Another object of the invention is the provision of improved supporting mechanism at the shoulder for cases in which the amputation is at or near the shoulder joint, *i. e.*, in which the joint is disarticulated or an insufficient length of stump is left to raise the artificial arm, and in accordance with this part of the invention we provide an improved hinge and shoulder cap.

A further object of the invention is to so support the arm at the shoulder that it is free to swing through a limited angle so as to give a more natural appearance when the wearer is walking; while still another object is to so control the arm that the tensioning of a single cable connected both to the forearm and upper arm will cause the upper arm to first rise to a limited extent, while a further tensioning will raise the forearm.

These objects are obtained in the manner hereinafter explained.

Referring to the drawings:

Figure 1 illustrates a simple form of worker's arm according to this invention comprising a socket of improved construction and a detachable hook.

Fig. 2 is a cross sectional view of the same at A—B in Fig. 1.

Fig. 3 is a perspective view of the metal skeleton framework detached from the socket.

Fig. 4 illustrates the hook removed.

Fig. 5 is a similar view to Fig. 1, showing a modified construction.

Figure 13:
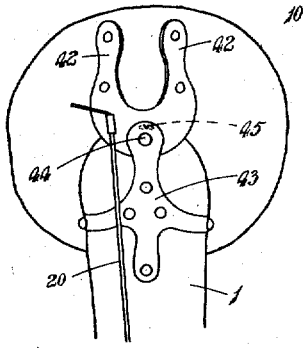

Fig. 13 discloses a shoulder connection, together with the operating cord.

Figure 14:
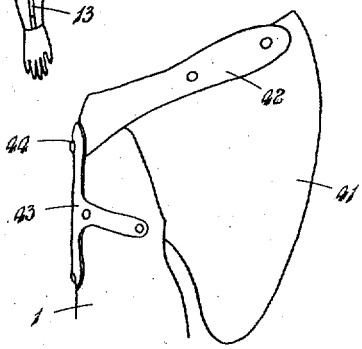

Fig. 14 shows a shoulder cap.

Figure 15:
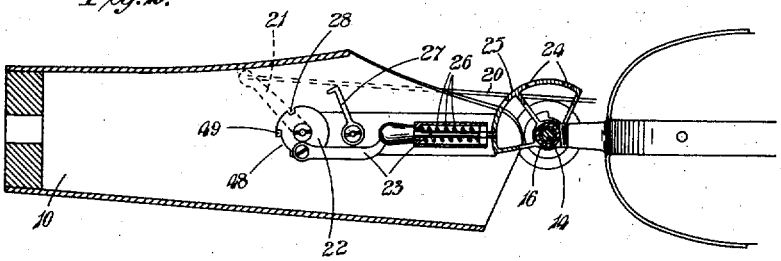

Fig. 15 is a view showing the forearm in locked position.

Figure 16:
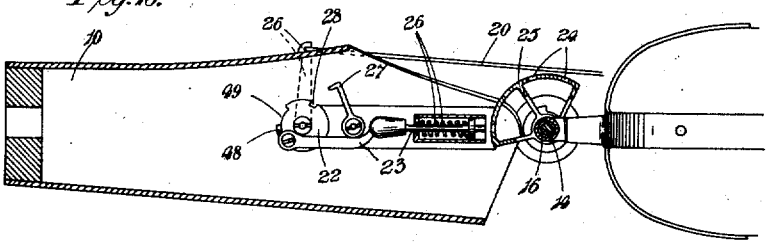

Fig. 16 is a similar view but showing the forearm in unlocked or released position.

Figure 17:
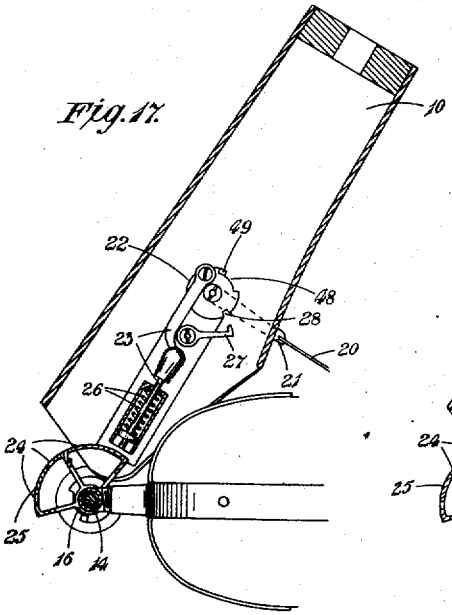

Fig. 17 is a view showing the forearm raised while the locking is still released.

Figure 18:
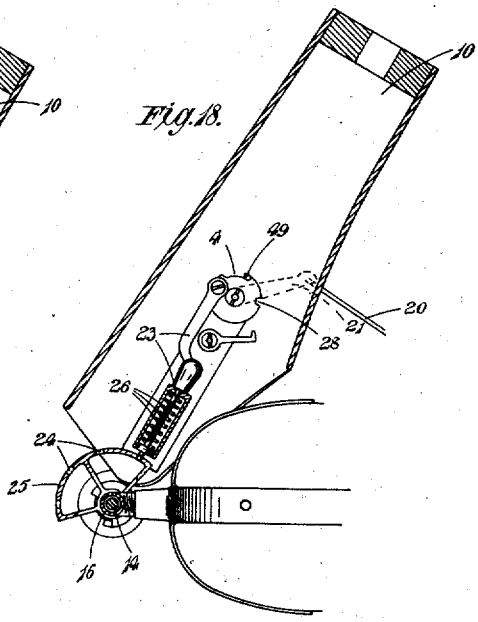

Fig. 18 is a similar view but with the forearm locked.

Fig. 19 is a detail of the locking bolt for the forearm.

In constructing a worker's arm according to this invention as shown in the accompanying drawings in Figs. 1–4, a leather socket portion 1 is provided blocked to receive the stump of the arm but having two overlapping edges 2, 2 so as to permit circumferential adjustment of the socket to enable it to be secured around the stump. Straps and buckles 3 are also provided for securing the socket in its adjusted position. The leather socket is disposed within a skeleton metal framework 4 which consists of four members which are disposed longitudinally along the socket and riveted thereto. This skeleton framework has a socket portion 5 at the end which receives the screwed extremity of the hook 6 secured in position by the wing nut 7.

An arm or arm substitute as described can readily be secured upon the stump of the upper arm in cases of amputation at or above the elbow, and it provides an extremely strong arm for the performance of rough work. The hook may be readily detached and other tools substituted therefor. The appliance may also be used for amputations below the elbow, in which case it is secured to the stump of the forearm and a correspondingly shortened hook employed.

In Fig. 5 a modified construction is shown in which the hook is adapted to be secured in the extremity of a tube 8.

In the construction shown in Figs. 6–11, the same form of socket is employed, but the arm has a complete forearm 10 which carries a hand 11, this forearm having a screwed member 12 which is adapted to screw into the socket 5 and to be interchangeable with the hook 6 thereby converting the worker's arm into one of a more natural appearance without necessitating the detachment of the socket from the stump and being intended for wear when appearance rather than capacity for rough work is desired. The forearm is provided with a pair of longitudinally disposed metal strips 13 which carry a pivoted bar 14 provided with a locking nut 15 and passing through a tubular member 16 which carries the aforementioned projection 12, the tightening of the nut 15 serving to retain the forearm in any position to which it may have been angularly adjusted. The tubular member 16 carries a flange 17 having a notch 18 which engages with a peg 19 on one of the members 13 so as to limit the angular movement about the elbow joint.

In conjunction with this forearm we employ improved controlling mechanism including a cable 20 secured to a crank arm 21 which passes through to the interior of the arm and carries a disk 22 which is connected to a sliding plunger 23 the nose of which is adapted to engage with a series of holes 24 in a sector 25, the releasing of this cable automatically locking the arm in its adjusted position, while the initial tensioning of the cable serves to release this locking device. The plunger 23 is normally held in engagement with one of the holes 24 by a spring 26.

While the initial tensioning of the cable releases the locking device, a further tensioning will cause the forearm to automatically rise, so that the one control releases the lock and raises the arm, which is a great advantage compared with the ordinary practice wherein two separate controls are required.

The four stages in the movement of the forearm and locking means are shown in Figs. 15–18. In Fig. 15 the forearm is shown in its fully extended position, the locking bolt being in its engaged position and the cable slack. When the cable is tensioned (Fig. 16), the disk 22 is rotated and the locking bolt withdrawn. The disk has a peripheral recess 48 in which is located a peg 49 secured to the forearm; the amount of relative movement between the disk and forearm being limited by the length of the recess which also determines the extent to which the locking bolt may be withdrawn. As seen in Fig. 16 the disk has reached the limit of its angular movement and the extremity of the recess is adjacent the peg. A further pull on the cable will thus operate to lift the forearm about its pivot to a position as shown in Fig. 17, the weight of the forearm offering a greater resistance to the cable than the spring 26, so that there is no tendency to lift until the locking bolt is fully retracted. If the tension on the cable is quickly and completely released the spring will quickly advance the locking bolt into engagement with one of the holes 24 as seen in Fig. 18; the spring operating before the forearm can fall by gravity. If the locking bolt is not opposite to one of the holes 24 when the tension is relaxed, the forearm will fall until engagement with the next lower hole takes place. To lower the forearm the cable is tensioned and the bolt retracted (Fig. 17); the tension is then partly relaxed allowing the forearm to fall, but sufficient tension is maintained to overcome the smaller force of the spring and the bolt kept retracted.

A locking pawl 27 adapted to engage with a notch 28 in the aforementioned disk 22 and controlled by an external arm 29 is provided for locking the member 23 out of engagement with the sector 25 so that the arm can be freely raised or lowered irrespective of the locking device.

The cable is illustrated as being in the form of a Bowden wire, but this is not necessary for a simple cable may be substituted if so desired. The inner member 20 of the cable is connected to the arm 21 by a nipple 31 and a pivoted ring 32 having a gap 33 so that this inner member 20 may be readily disengaged from the ring and arm 21 if so desired as when it is required to detach the forearm and substitute the hook. For this purpose, the nipple, which is soldered to the end of the cable 20 in the usual way, is withdrawn endwise clear of the ring and the cable detached by a sidewise movement. The end of the outer member 35 of the Bowden mechanism fits within a member 36 pivoted upon the upper arm socket, this member 36 having a longitudinal slot so that by withdrawing the member 35 clear of the member 36 the cable 20 may then be detached from connection with the upper arm, so that the upper arm socket may be employed with a hook and without any controlling mechanism.

Figure 6:
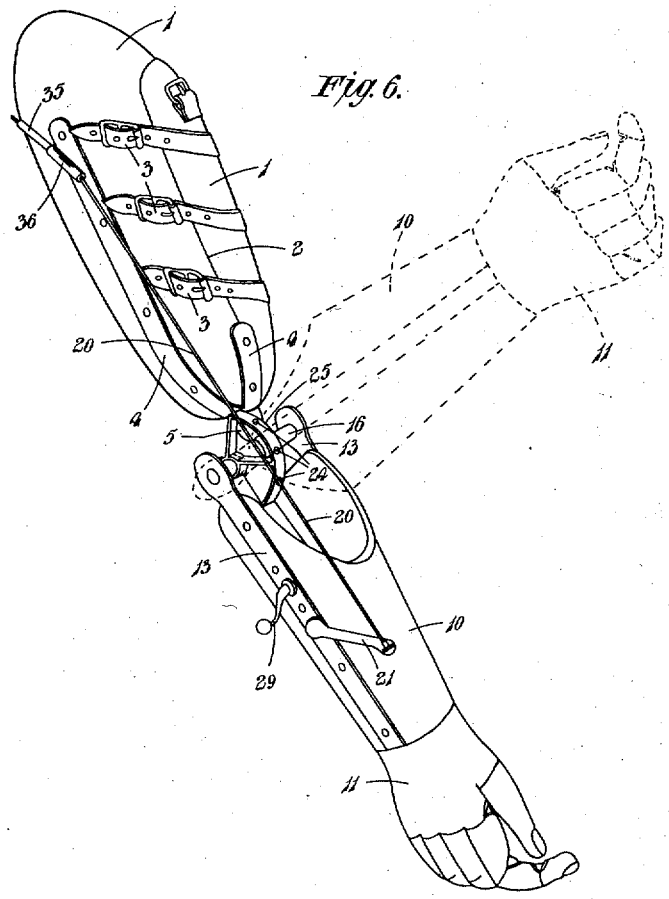
Fig. 6 illustrates a complete arm having a socket constructed in similar manner, but also provided with a detachable forearm and improved controlling mechanism.
Figure 7:
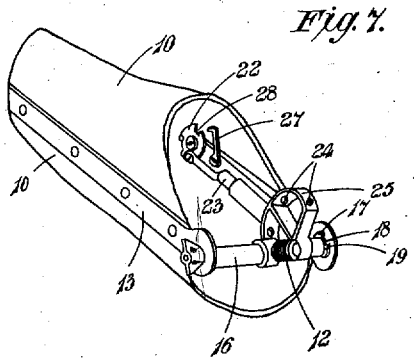
Fig. 7 is a view of the forearm detached.
Figure 8:
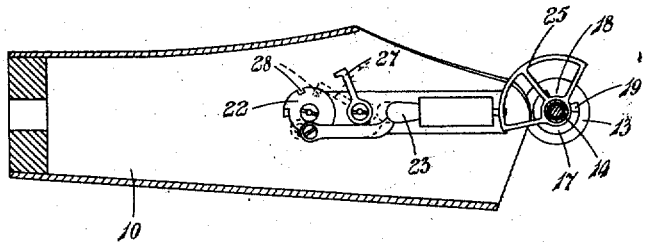
Fig. 8 is a sectional view of the device as illustrated in Fig. 7, but showing the locking mechanism for securing the arm in the various positions to which it may have been raised.
Figure 9:
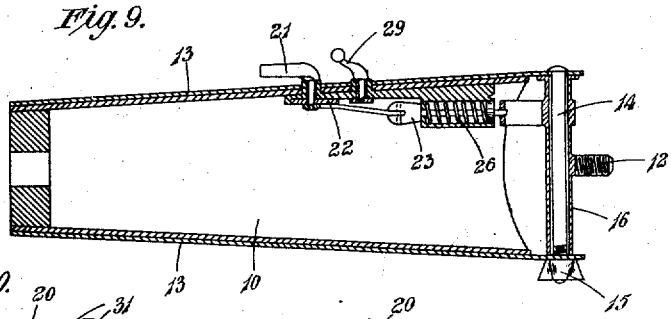
Fig. 9 is still another section along Fig. 7, but showing the parts in greater detail.
Figure 10:
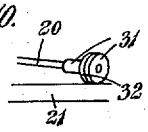
Figs. 10 and 11 are detail views of a controlling crank arm.
Figure 11:
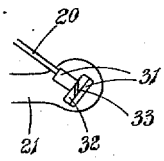
Figure 12:
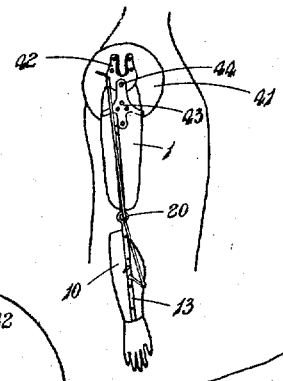
Fig. 12 illustrates an arm in position mounted by improved mechanism such as is required for a disarticulated shoulder joint.

In Figs. 12–14 a manner of mounting is shown which is adapted for use in cases where the shoulder joint has been disarticulated or where the length of the stump left is insufficient to carry the arm. In this construction a shoulder pad 41, which may be conveniently made of leather blocked to fit the shoulder is provided and carries a metal hinge member 42 to which is pivotally secured another hinge member 43 pivoted to the member 42 at 44, the member 43 being riveted or otherwise secured to the socket or member corresponding with the upper arm. To permit the arm to swing freely when it is in a vertical position as when walking, the member 42 is provided with an annular slot 45 which is engaged by a peg on the member 43 permitting a limited swinging movement. Or the slot may be in the member 43 and the peg on the member 42.

The controlling mechanism is of similar form to that described in detail with reference to the previous construction, but as will be seen from an inspection of Fig. 12, the points at which the controlling cable is connected to the shoulder pad, upper arm and forearm are such that the initial tensioning of the cable will serve to first raise the upper arm until the pin reaches the end of the annular slot, while a further tensioning will cause the forearm to rise. Thus the one cable will release the lock, raise the upper arm to a limited angle and finally fully raise the forearm. By this means the arm is raised with a much more natural appearance than when the forearm alone is raised.

Having thus described our invention, what we claim is:—

1. In an artificial arm, the combination of an upper arm socket, a forearm pivoted thereto, a sliding bolt for locking said forearm in its adjusted position relatively to the socket, a crank on the forearm controlling said sliding bolt and having a limited movement only, and a controlling cable connected to said crank for the purpose specified.

2. In an artificial arm, the combination of an upper arm socket, a forearm pivoted thereto, a sliding bolt for locking said forearm in its adjusted position relatively to the socket, a crank on the forearm controlling said sliding bolt and having a limited movement only, a controlling cable connected to said crank, and means for locking said bolt at will in its inoperative position, substantially as described.

3. In an artificial arm in combination, a forearm, an upper arm socket, an elbow joint comprising a tubular member, a projection on said tubular member whereby it may be connected with said socket, a pivot bar within said tubular member, and a nut on said pivot bar.

4. In an artificial arm in combination, a forearm, an upper arm socket, an elbow joint comprising a tubular member disposed across the forearm, a projection on said tubular member whereby it may be connected with said socket, a pivot bar within said tubular member, a nut on said pivot bar, and means whereby the angular movement of the forearm with respect to the socket is restricted.

5. In an artificial arm in combination, a forearm, an upper arm socket, an elbow joint comprising a tubular member disposed across the forearm, a projection on said tubular member whereby it may be connected with said socket, a pivot bar within said tubular member, a nut on said pivot bar, a sector fixed to said tubular member having a series of holes therein, and a releasable plunger coöperating with said sector for temporarily fixing one arm member with respect to the other.

6. In an artificial arm, the combination of an upper arm socket, a forearm pivoted thereto, a sliding bolt for locking said forearm in its adjusted position relatively to the socket, a disk on said forearm connected to said forearm and having a limited movement only relatively to the forearm, and a controlling cable connected to said disk.

7. In an artificial arm, the combination of an upper arm socket, a forearm pivoted thereto, a sliding bolt for locking said forearm in its adjusted position relatively to the socket, a controlling cable connected to said locking bolt, means for limiting the extent to which said sliding bolt may be retracted, and a spring for advancing said sliding bolt into its locking position, said spring offering a less resistance to the cable than is offered by the weight of the forearm whereby the initial tensioning of the cable will first withdraw the bolt, while a further tensioning will raise the forearm.

8. In an artificial arm the combination of an upper arm; a forearm pivoted thereto; a locking device located on the forearm and adapted to engage with the upper arm for the purpose of locking the upper arm and forearm in various relative angularly adjusted positions, a controlling cable connected to said locking device and serving when tensioned to release same, and means for limiting the retractive movement of the locking device and for simultaneously therewith transmitting the tension of the said cable to the then unlocked forearm whereby said forearm is moved angularly in relation to the upper arm, all for the purpose specified.

9. In an artificial arm the combination of an upper arm, a forearm pivoted thereto, a locking device adapted to lock the forearm and upper arm in various angularly adjusted positions, a pivoted member located on the forearm and connected with said locking device, a controlling cable connected to said pivoted member, and means for limiting the movement of the pivoted member in one direction and for simultaneously therewith transmitting the tension of the said cable to the then unlocked forearm whereby said forearm is moved angularly in relation to the upper arm, all for the purpose specified.

WILLIAM PURVES ANDERSON.
NORMAN CARLYLE CLARKE.
JOHN FALCONER WHITELAW.